April 20, 1943. H. R. SCHEMM 2,316,814
FEEDER
Filed March 8, 1940 2 Sheets-Sheet 1

INVENTOR.
Henry Ripley Schemm
BY Barnes Kisselle Laughlin & Raisch
ATTORNEYS

April 20, 1943. H. R. SCHEMM 2,316,814
FEEDER
Filed March 8, 1940 2 Sheets-Sheet 2
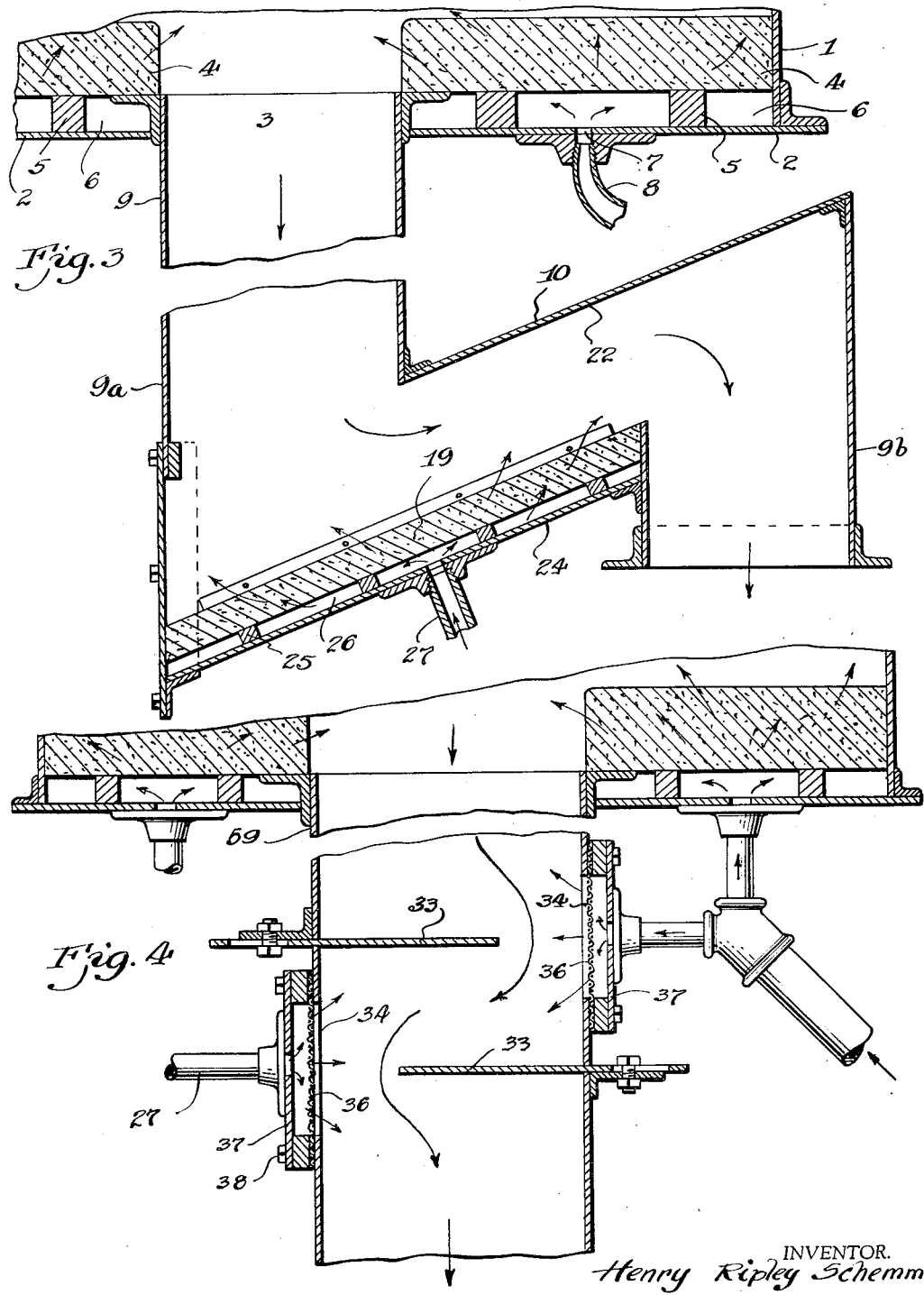

Patented Apr. 20, 1943

2,316,814

UNITED STATES PATENT OFFICE 2,316,814

FEEDER

Henry Ripley Schemm, Detroit, Mich.

Application March 8, 1940, Serial No. 323,051

5 Claims. (Cl. 193—2)

This invention relates to a feeder for controlling and regulating the flow of powdered material such, for example, as cement, flour, farina and the like.

In the handling of powdered materials such, for example, as cement, it is common practice to store the cement in large storage bins or silos. Such a silo is provided with a discharge opening in its floor through which the cement is fed by gravity, numerous known expedients being used to facilitate the gravitational flow of the cement. In withdrawing or feeding the cement from the silo it is desirable that the flow be precisely controlled, that is, the rate of flow should be accurately regulated and the flow completely stopped or started instantaneously at the will of the operator. It is one of the objects of this invention to produce a feeder for powdered materials, such as cement, which will not only accurately regulate the flow of the cement but will also lend itself to precise and instantaneous stopping and starting of such flow.

It is also desirable that the feeder for powdered material should lend itself to ready and easy installation in the known systems for storing and handling such materials and should require but a minimum of space. It is also an object of this invention to produce a feeder for powdered materials which is of simple, compact and inexpensive construction and which readily lends itself to installation in any feed line running from a source of storage of such powdered materials.

In the drawings:

Fig. 3 is a vertical section through a modified form of feeder.

Fig. 4 is a vertical section through a second modified form of the invention.

Figure 1:
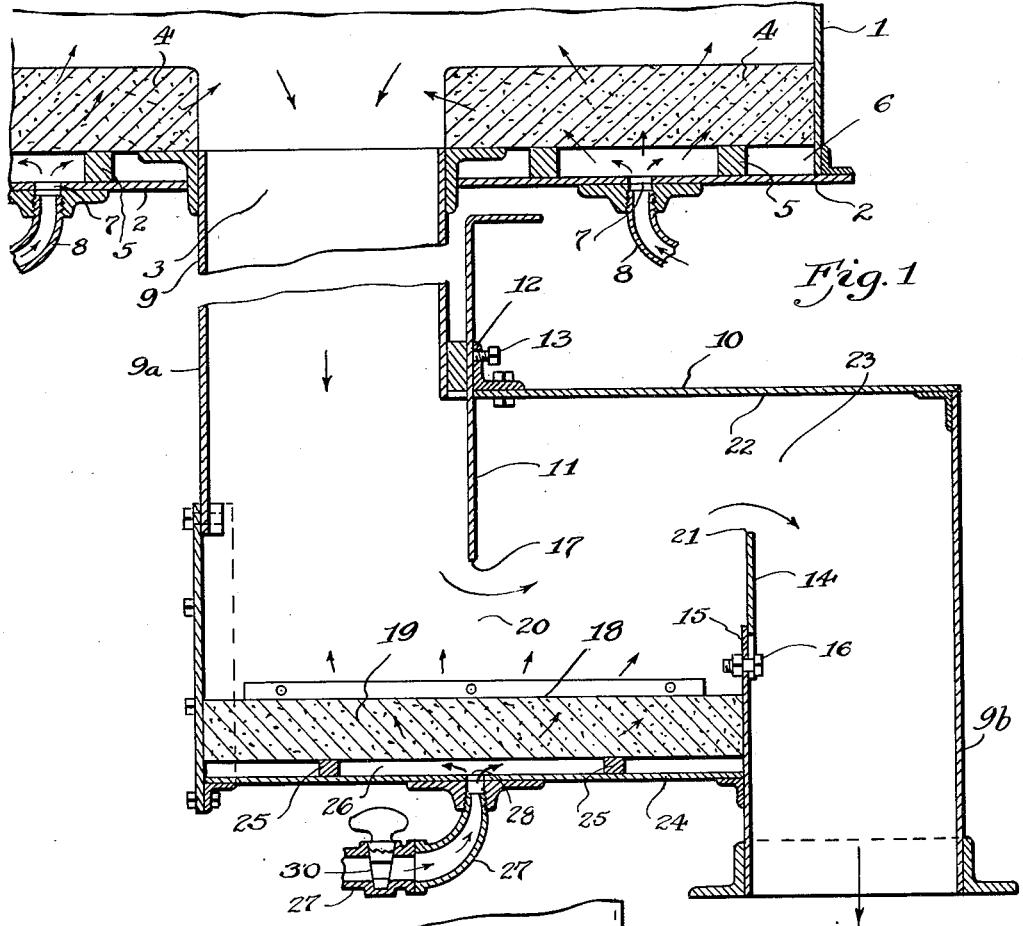
Fig. 1 is a vertical section showing the feeder which is the subject matter of this invention.
Figure 2:
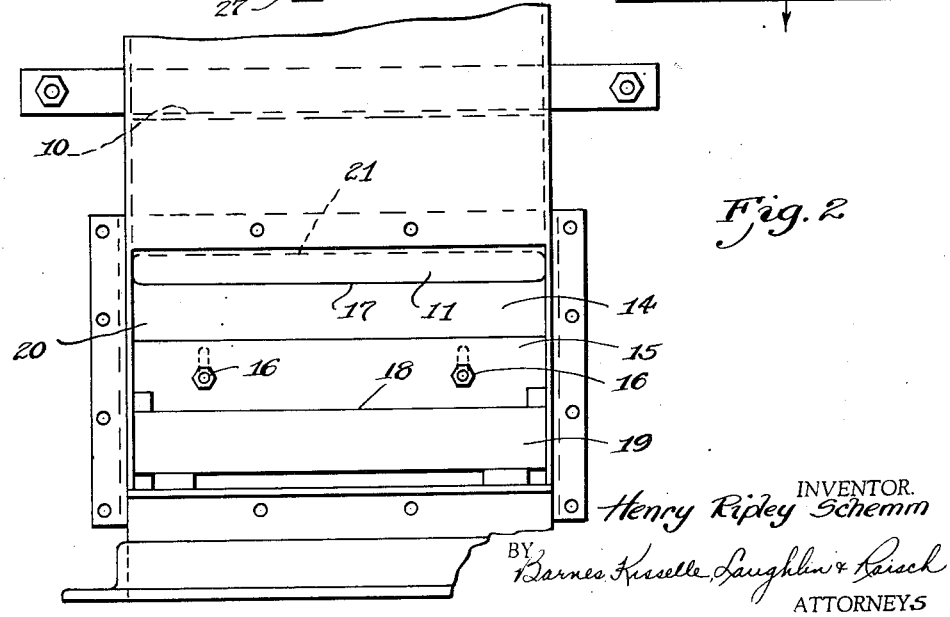
Fig. 2 is an end view taken from the left-hand side of Fig. 1 with the cover plate removed.

Referring more particularly to the drawings there is shown a fragmentary portion of a silo 1 having a floor 2 which is utilized for storage or as a source of a powdered material such as cement.

The floor of the silo is provided with an outlet 3 through which the cement is discharged as indicated by the arrows. To facilitate the discharge of the cement, the cement may be aerated or fluidified by an arrangement consisting of a floor of porous brick 4 spaced above the floor 2 of the silo on supports 5 to provide a space 6. The space 6 is supplied with compressed air through opening 7 by line 8 connected with a source of compressed air (not shown). The compressed air passes through the pores of the porous brick 4 and is intimately mixed with the cement so that the cement flows and assumes the characteristic of a fluid. As thus aerated the cement flows by gravity along the upper surface of the porous bricks 4 into outlet 3 and discharge spout 9. The spout 9 extends in an up and down direction so that the flow of cement therethrough is by gravity. After the cement leaves the floor made up by the porous bricks 4 and falls into spout 9, it substantially or pretty much loses its fluid characteristics and again assumes the characteristics of powdered unaerated cement.

For controlling the flow of cement through outlet 3 and spout 9, it is proposed to assemble a feeder, which is the subject of this invention, in spout 9. This feeder in its broad aspects comprises an obstruction to the normal flow by gravity of the powdered material in its unaerated state. The obstruction is such that the cement in its normal condition cannot flow by the obstruction and therefore the flow of cement through outlet 3 and spout 9 is stopped. The obstruction also assumes such a nature that once the cement is properly aerated, it readily surmounts or passes by the obstruction and establishes free and normal flow of the cement through spout 9. For purposes of description rather than by way of limitation, the feeder will now be described.

In the principal form of the invention the obstruction takes the form of a horizontal offset 10 in spout 9. The offset spout line 10, as shown, is of rectangular cross section but obviously can be of circular or other polygonal cross section.

The offset 10 is provided with a vertically adjustable baffle 11 positioned adjacent the upstream portion 9a of the spout 9. The baffle 11 may be slidably adjusted upwardly and downwardly in its guide 12 and held in any desired position by the set screw 13. Another vertically adjustable baffle 14 is positioned in the offset 10 adjacent the downstream portion 9b of the spout 9. This baffle 14 can be adjusted up and down upon its support 15 and held in adjusted position by bolts and nuts 16. The lower edge 17 of baffle 11 cooperates with the upper face 18 of the porous brick 19 to form an opening 20 through which the cement passes. The upper edge 21 of baffle 14 cooperates with the top wall 22 of the offset 10 to form an opening 23 through which the cement passes. Thus the size of opening 20 is increased by an upward adjustment of baffle 11 and decreased by a downward adjustment thereof. The size of opening 23 is increased by a downward adjustment of baffle 14 and decreased by an upward adjustment thereof. This adjustment of the baffles 14 and 11 is a factor in determining and controlling the rate of flow or volume of cement passing through the feeder 10.

The offset 10 in the spout 9 with its horizontal bottom should be of sufficient length that it acts as an obstruction which will stop the normal flow of the unaerated cement through spout 9. One or both of the baffles 11 and 14 are preferably, but not necessarily, inserted in the offset 10 so that the length of the offset can be materially shortened. When a baffle such as 11 or 14 is used, then the length of the horizontal offset portion 10 is preferably insufficient to stop the flow of material in its normal state. Thus the use of one or both of the baffles 14 materially adds to the compactness and appreciably decreases the size of the feeder. Further, the baffles also give precise and accurate control of the flow of the powdered material so that the flow of said material is coterminous with the flow of compressed air through porous medium 19.

Since the offset 10 with its preferred baffles 11 and 14 acts as an obstruction which stops the normal flow of cement through spout 9, it is essential in the operation of the feeder that means must be provided for overcoming this obstruction and effecting a flow of cement through the feeder. This object is achieved by introducing compressed air into the material at the point or in the area of the obstruction at sufficiently low pressure so that the air will filter into the cement and fluidify the cement or intermix with the cement so that the resultant mixture of cement has the characteristic of a fluid particularly from the standpoint of flow. The point is that the friction between the particles or grains of cement in its normal state is sufficient to prevent the flow of the cement through offset 10 and past baffles 11 and 14. The introduction of air into the cement reduces this friction between the cement particles sufficiently to induce flow. The air may be introduced into the cement at offset 10 through any suitable porous medium such as porous brisk, closely woven fabric, a multiplicity of small air jets, a block of sponge rubber, or filter stone. Preferably, although not necessarily, the size of the pores or the outlets of the air jets should be sufficiently small so that when the compressed air is not flowing through the pores or jets, cement particles will not be able to enter the pores or jets and obstruct or plug the same. Preferably the pores or jets should be sufficiently small so that the air will flow into the cement in a finely divided state so that it will readily mix with the cement and fluidify the same. As herein shown the element 19 is a porous refractory insulating brick which is supported above the bottom wall 24 of the feeder by supports 25 to provide an air space 26 between the bottom face of the brick 19 and the wall 24 of the feeder. Compressed air is admitted into space 26 from any suitable source of compressed air by pipe line 27 and inlet 28.

The operation of this device is as follows: The cement or other powdered material upon passing through outlet 3 will reach the feeder 10. Assuming that the valve 30 in the compressed air line 27 is open, upon reaching the porous brick 19, the finely divided air emitted from the brick will intermix and fluidify the cement so that it assumes the characteristics of a fluid. As thus fluidified the cement will flow as indicated by the arrows through opening 29 beneath baffle 11 and through opening 23 over baffle 14, thence into the spout 9b. The instant that valve 30 is closed, shutting off the flow of compressed air through porous brick 19, the cement ceases to be aerated, loses its fluid characteristics, and ceases to flow. Thus the flow of cement is practically coterminous with the flow of compressed air through the porous insulating brick 19. In actual practice the pressure of the air in space 26 has been maintained approximately at five pounds per square inch. However, pressures lower than this and as high as thirty pounds per square inch have been used satisfactorily. If pressures much higher than this are used, the air tends to pass through the cement in streams and aeration or fluidifying of the cement is impaired as the pressure increases.

In Fig. 3 a modified form of the feeder is shown which is practically the same as the principal form except that the need for the baffles 11 and 14 has been obviated by positioning the offset 10 in the spout 9 so that it is inclined upwardly in the direction of flow of the fluidified cement indicated by the arrows. Thus the upper wall 22, the floor 24 and the porous brick 19, are all positioned at an angle to the horizontal and are upwardly inclined in the direction of flow of the cement. The angle or upward inclination of the offset 10 is such that the downward gravitational flow of the unaerated cement in its normal powdered condition is obstructed and stopped. In other words, the friction between the particles of cement is such that in its normal unaerated state it cannot flow from the upstream portion 9a of the spout 9 through the upwardly inclined feeder 10 into the downstream portion 9b of spout 9. However, when compressed air, as above described, is admitted through pipe line 27 into space 26 from whence it flows through porous brick 19 and aerates or fluidifies the cement, then the cement assumes the characteristic of a fluid and flows freely through the feeder 10. Here again when the compressed air is turned off by closing valve 30, flow of the cement ceases.

In Fig. 4 a second modified form of feeder is shown. In this form of the invention the spout 59 is provided with a plurality of adjustable horizontal baffles 33 positioned alternately on opposite sides of the upright spout 59 so that the cement in passing by the baffles will have to take the circuitous route indicated by the arrows. The arrangement of the baffles is such that the cement in its normal unaerated state cannot flow by the baffles, that is, the flow of the cement in its normal condition is arrested or completely stopped by the baffles 33. To fluidify the cement a plurality of openings 34 are provided in the spout 59, preferably one opposite the inner end of each baffle 33. A fine mesh or closely woven fabric 36 is secured over each opening 34 by means of housing 37 which is secured to the spout by bolts 38. A porous brick may be substituted for fabric 36. Compressed air passes from the feed line 27 through the fabric 36 in each opening 34 to aerate or fluidify the cement. Thus the flow of cement through the spout 59 is controlled by the flow of compressed air through fabric 36, that is, as long as compressed air is flowing through line 27 and fabric 36, the cement is aerated and flows through the spout 59 and as soon as the compressed air is turned off and ceases to flow through fabric 36 the flow of cement ceases.

It should be noted that in the two forms of the invention shown in Figs. 1 and 3 that the porous medium 19 actually acts as a baffle in the spout 9 for obstructing the flow of the cement in its normal condition. As used herein "normal condition" of the cement means the condition of the cement when it is not aerated or fluidified by the compressed gas passing through the porous medium.

I claim:

1. In combination with a conduit through which powdered material flows from an inlet end to a lower outlet end, said conduit having a transverse portion with its bottom wall positioned horizontally, a baffle in said transverse portion extending in a substantially vertical plane for stopping the flow of said material in its normal condition through the conduit, a porous medium positioned in the bottom of said transverse portion, and means for forcing gas at low pressure through said porous medium to fluidify the said material whereby said material while thus fluidified flows by gravity through said conduit and transverse portion.

2. In combination with a substantially vertical conduit through which a powdered material flows with the aid of gravity, a horizontal conduit portion communicating with the vertical portion having a length of itself insufficient to stop the flow of said material in its normal condition, a baffle for partially obstructing the horizontal portion of said conduit, the said horizontal conduit portion cooperating with the baffle to stop the flow of material in its normal condition through the conduit, a porous medium in said horizontal portion, and means for forcing gas at low pressure through said porous medium to fluidify said powdered material whereby said material while thus fluidified flows by gravity through said conduit and horizontal portion.

3. In combination with a substantially vertical conduit through which a powdered material flows with the aid of gravity, a horizontal conduit portion communicating with the vertical portion, said horizontal conduit portion being of a size insufficient to stop the flow of said material in its normal condition, a baffle extending upwardly from the bottom wall of said horizontal conduit portion for partially obstructing the horizontal portion of said conduit, the said horizontal conduit portion cooperating with the baffle to stop the flow of material in its normal condition through the conduit, a porous medium in said horizontal portion, and means for forcing gas at low pressure through said porous medium to fluidify said powdered material whereby said material while thus fluidified flows by gravity through said conduit and horizontal portion.

4. In combination with a substantially vertical conduit through which a powdered material flows with the aid of gravity, a horizontal conduit portion communicating with the vertical portion of size insufficient to stop the flow of said material in its normal condition, a porous medium in said horizontal portion, a baffle extending upwardly from the down-flow end of the bottom wall of said horizontal conduit portion for partially obstructing the horizontal portion of said conduit, the said horizontal conduit portion cooperating with the baffle to stop the flow of material in its normal condition through the conduit, and means for forcing gas at low pressure through said porous medium to fluidify said powdered material whereby said material while thus fluidified flows by gravity through said conduit and horizontal portion.

5. In combination with a substantially vertical conduit through which a finely divided material in its normal condition flows by gravity, a horizontal conduit portion communicating with the vertical portion of size insufficient to stop the flow of said material in its normal condition, a baffle extending upwardly from the bottom wall of said horizontal conduit portion for partially obstructing the horizontal portion of said conduit, a baffle extending downwardly from the upper wall of said horizontal portion adjacent the vertical portion of the conduit for partially obstructing the horizontal portion of said conduit, the said horizontal conduit portion cooperating with the baffles to stop the flow of material in its normal condition through the conduit, a porous medium in said horizontal portion, and means for forcing gas at low pressure through said porous medium to fluidify said finely divided material whereby said material while thus fluidified flows by gravity through said conduit and horizontal portion.

HENRY RIPLEY SCHEMM.